Nov. 1, 1966 T. G. TODD 3,282,403
BELT CONVEYOR SUITABLE FOR USE AS AN UNDERGROUND
COAL MINING FLOOR CONVEYOR
Filed March 31, 1964 6 Sheets-Sheet 1

INVENTOR
TERRILL G. TODD

BY Cushman, Darby & Cushman
ATTORNEYS

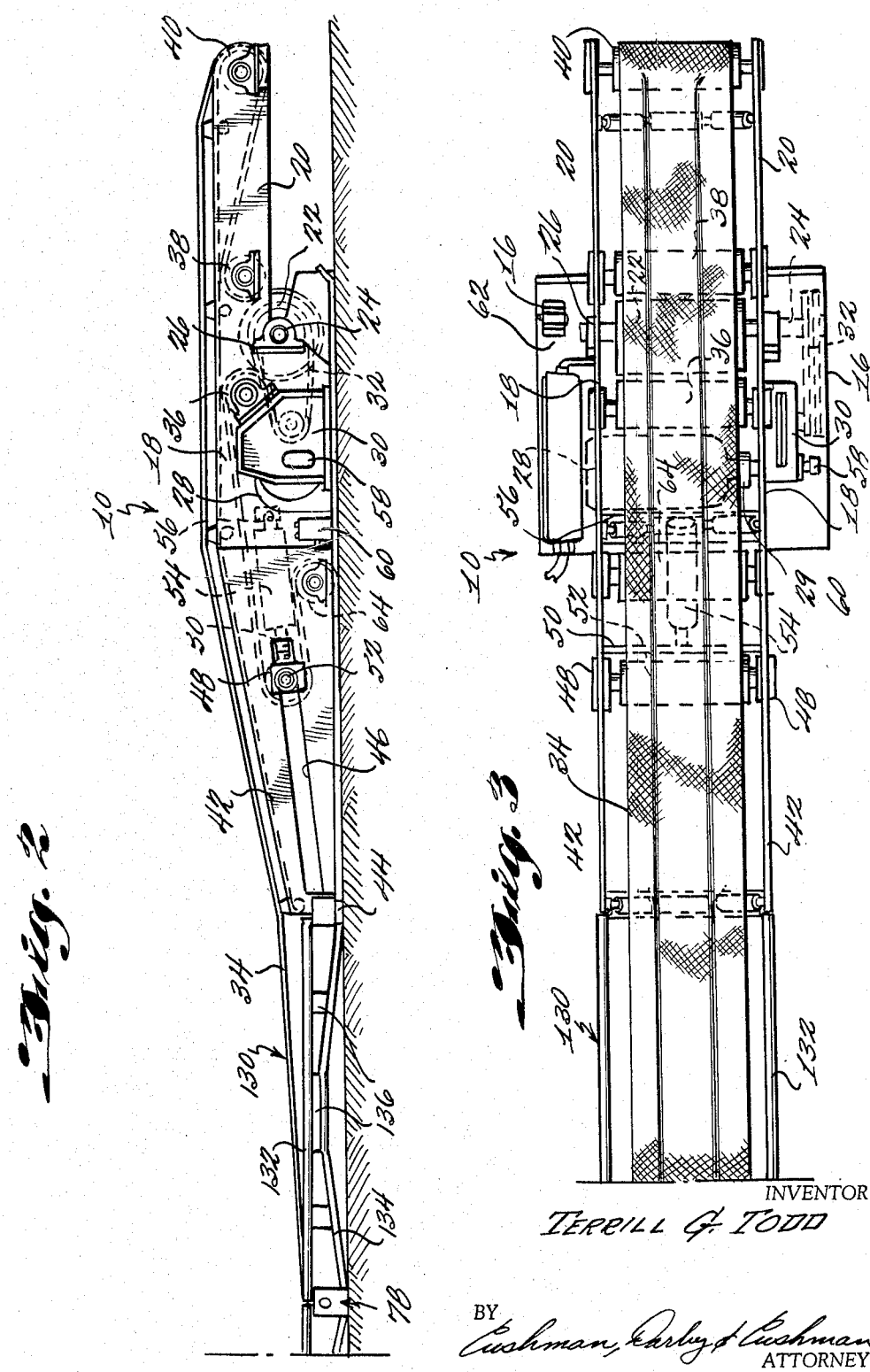

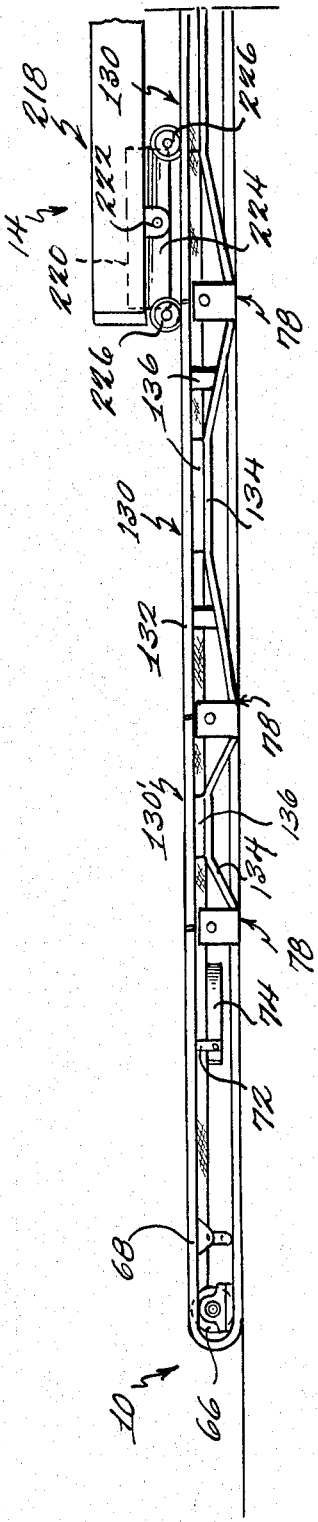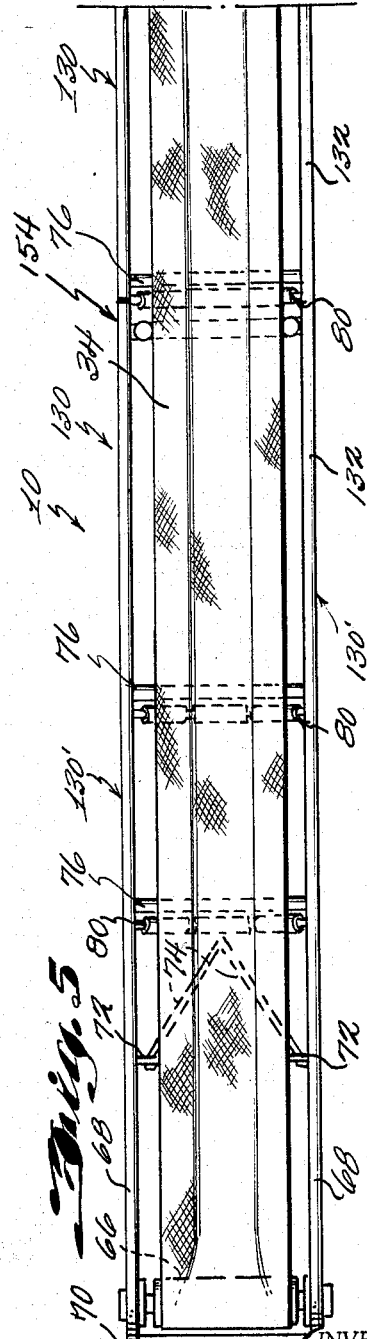

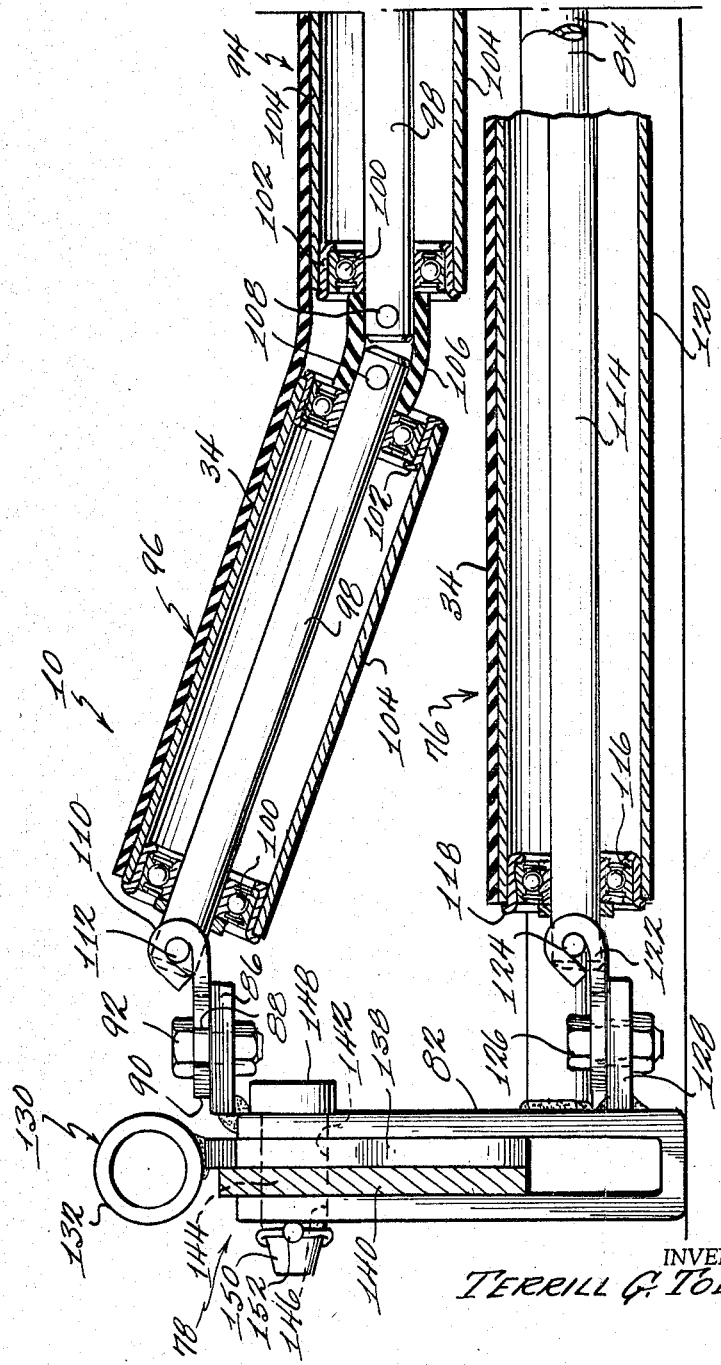

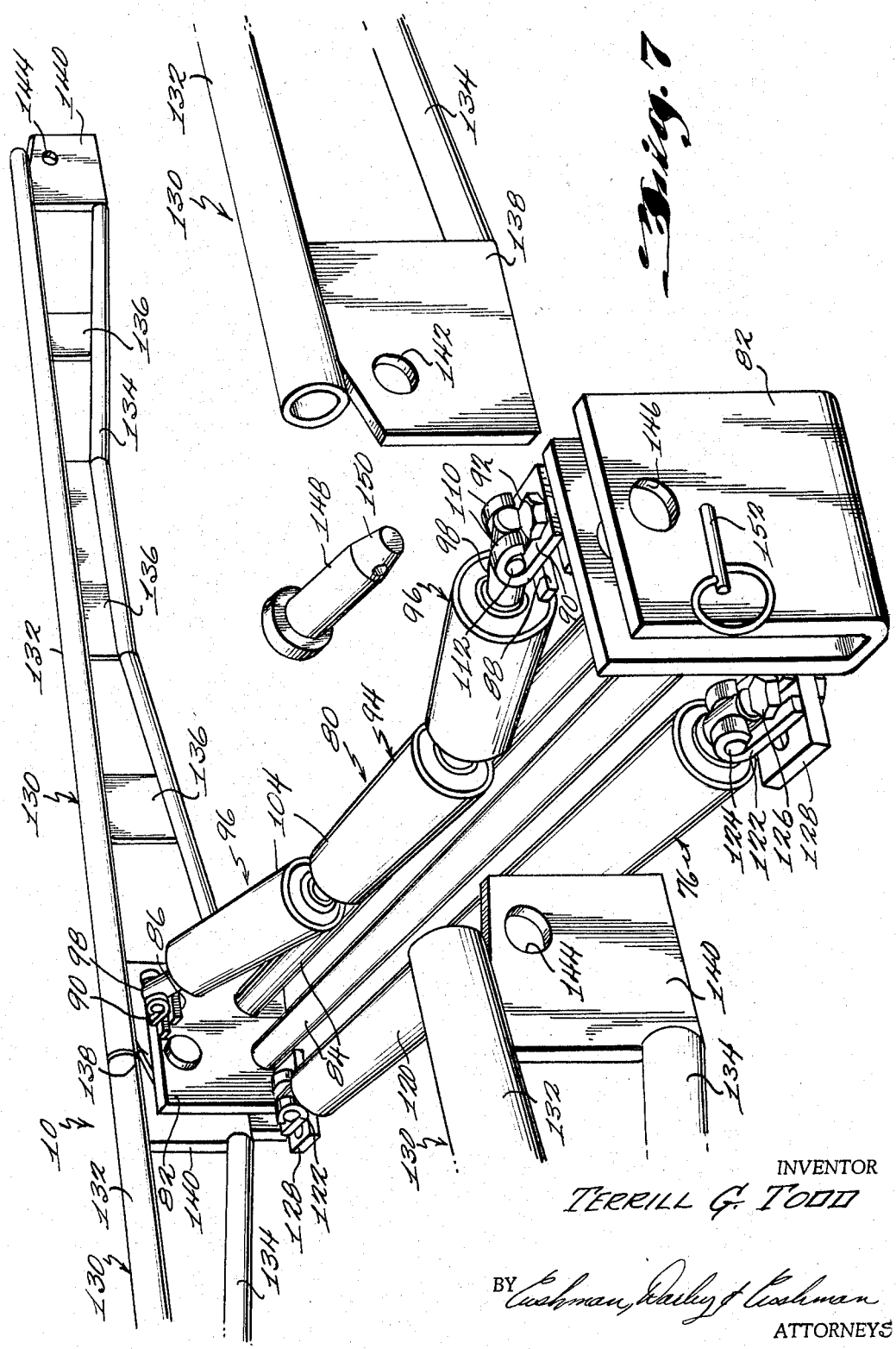

Nov. 1, 1966 T. G. TODD 3,282,403
BELT CONVEYOR SUITABLE FOR USE AS AN UNDERGROUND
COAL MINING FLOOR CONVEYOR
Filed March 31, 1964 6 Sheets-Sheet 6
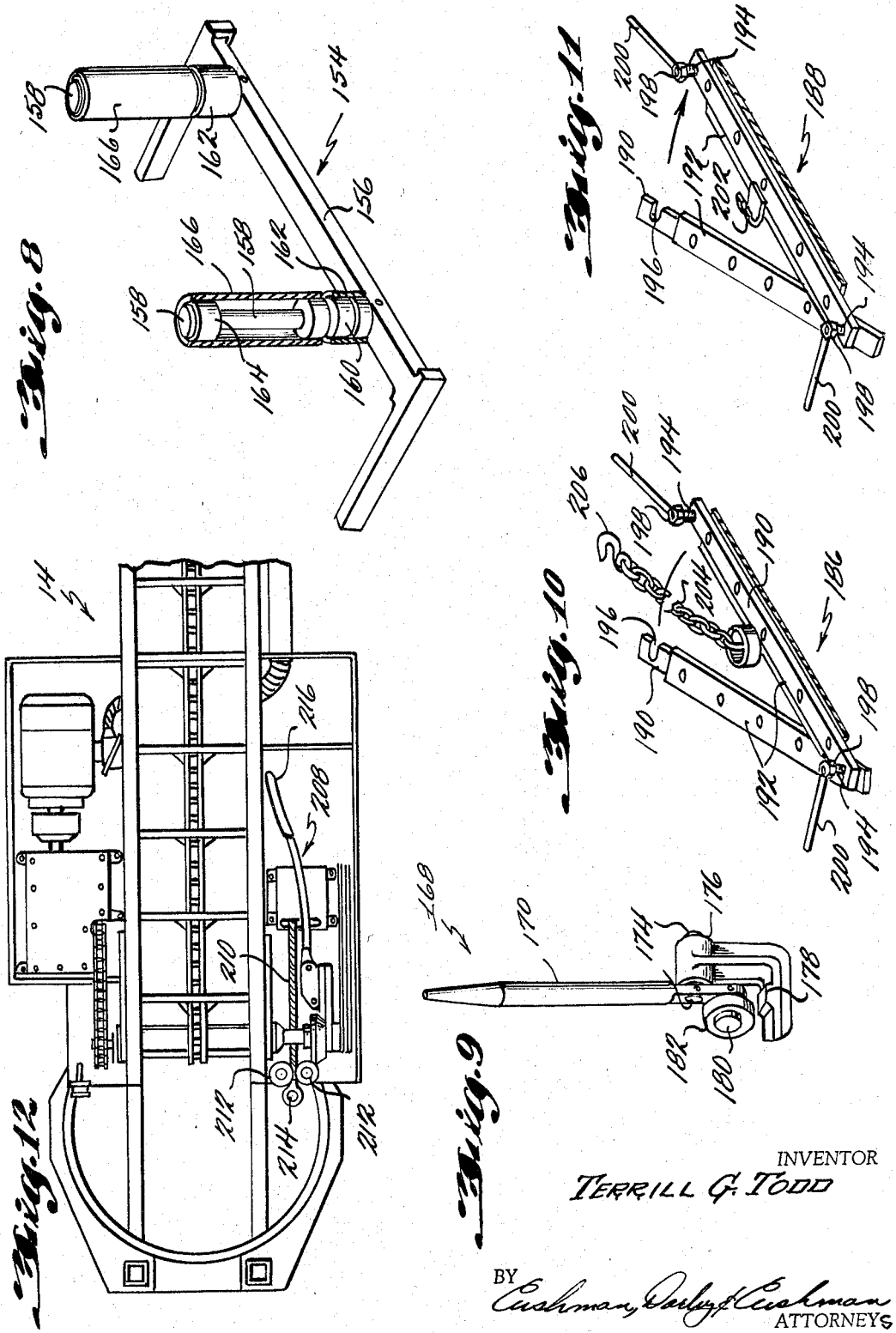
INVENTOR
TERRILL G. TODD
BY
ATTORNEYS

United States Patent Office 3,282,403
Patented Nov. 1, 1966

3,282,403
BELT CONVEYOR SUITABLE FOR USE AS AN UNDERGROUND COAL MINING FLOOR CONVEYOR
Terrill G. Todd, Beaver, W. Va., assignor to Wilcox Manufacturing Company, Raleigh, W. Va., a corporation of West Virginia
Filed Mar. 31, 1964, Ser. No. 356,151
16 Claims. (Cl. 198—139)

This invention relates to material handling and more particularly to a conveyor adapted to transport coal in underground coal mines.

The conveyor of the present invention is especially suited for use as a floor conveyor in an underground coal mine of the type adapted to receive coal from a bridge conveyor which, in turn, receives coal from the machine working at the face, either a continuous mining machine or a loading machine. A floor conveyor of this type must therefore keep pace with the mining operation as the position of the face of the coal being mined changes. It has been the practice heretofore to utilize chain scraper conveyors for this purpose. A floor chain scraper conveyor assembly of conventional construction is made up of a plurality of pan sections which are detachably connected together, the pan sections providing a continuous upper flight surface, which supports the coal, and usually a lower return flight surface. The coal supported on the upper flight surface is moved therealong by a plurality of longitudinally spaced flight bars or scrapers. The scrapers are connected either to a central chain and extend from opposite sides thereof or to a pair of chains and extend therebetween. One of the advantages of a chain scraper type floor conveyor is that links can be added or taken away from the chain at any desired place by a fairly simple procedure. Moreover, the path of travel of a chain around a sprocket wheel is easily controlled and does not require the application of friction to achieve a driving relation.

On the other hand, a chain scraper type floor conveyor presents the primary disadvantage that the pan sections must be heavy because of the necessity to provide an upper coal supporting flight surface. This excessive weight makes the task of "panning up" much more difficult and time consuming. The term "panning up" as used herein contemplates both the connection of additional pans to the conveyor assembly and the removal of pan sections from the conveyor assembly.

It will be understood that whenever it is necessary to pan up the floor conveyor assembly in order to keep pace with the machine working at the face, the production of coal by the face machine must be stopped. The "down time" resulting from a panning up operation greatly affects the total production at the mine. Thus, whenever the time required to pan up can be lessened the tons per man shift, which is generally regarded to be the best criteria of productivity, increases.

Another disadvantage of a chain scraper type floor conveyor is that it requires a greater amount of power to operate. This is primarily due to the weight of the chain and scrapers which travel in an endless path and the fact that the coal being moved is in moving frictional contact with the stationery upper flight surface of the pan sections. Thus, there is a definite limitation as to the maximum length a given chain scraper type conveyor can be extended, depending upon the power source embodied therein.

It is well known that a belt conveyor assembly utilizing the same amount of power as a chain scraper type conveyor can have a maximum length considerably greater than the maximum length of the chain scraper type conveyor. However, for the reasons indicated above, chain scraper type conveyors are used almost entirely as floor conveyors in conjunction with coal mining face machinery.

It has been proposed to utilize expansible belt conveyor assemblies which can be expanded and retracted through power operation without the necessity of stopping the movement of the belt during such expansion or retraction. While such conveyor assemblies have, indeed, eliminated down time because of the elimination of the panning up operation, such assemblies are extremely costly and to date they have not received any widespread acceptance, largely, it is presumed, because the expense involved is not justified by the down time saving. Moreover, the expansible and retractable belt conveyor assemblies of this type have not been adapted to operate with a bridge conveyor, the discharge end of which rides on the floor conveyor structure itself.

In underground coal mining the use of belt conveyors as part of the transportation system for getting the coal out of the mine has become quite widespread. Usually the belt conveyors are installed for operation in the entries so that there is no necessity to expand or retract the length thereof as the mining operation proceeds.

A type of belt conveyor assembly which has achieved widespread acceptance for such uses utilizes cables on each side of the assembly to support the roller assemblies over which the endless belt passes. This arrangement provides adequate strength with a minimum weight. However, such assemblies are not susceptible to simple extension and contracton for the reason that, in order for the cables to provide the necessary suspending strength, they must be maintained in a relatively taut or tensioned condition. Thus, it is not a simple operation to assemble or disassemble a section of tensioned cable. Moreover, such cables would not provide adequate means for supporting the end of a bridge conveyor or the like.

Accordingly, it is an object of the present invention to provide a floor conveyor assembly which achieves all of the advantages of a belt type conveyor while at the same time retaining all of the advantages of a sectionalized chain scraper type conveyor capable of being panned up.

Another object of the present invention is the provision of a belt conveyor assembly which is capable of being panned up, that is, extended or contracted in length, in a minimum down time with a minimum amount of physical effort and which, at the same time, provides the strength required to rollingly support the discharge end of a bridge conveyor or the like.

A further object of the present invention is the provision of a belt conveyor assembly of the type described having a sectionalized construction which enables the sections to be easily handled, quickly assembled with a minimum of down time.

A still further object of the present invention is the provision of a belt conveyor assembly of the type described having a novel pin connection enabling the conveyor assembly to be assembled or disassembled in a simple manner and with a minimum amount of time.

Still another object of the present invention is the provision of a belt conveyor assembly having a novel pin connection of the type described which provides for a desirable limited vertical articulation of the conveyor assembly so as to enable the conveyor to conform to unevenness in the floor of the mine while at the same time providing for horizontal rigidity, thus insuring proper belt alignment.

Another object of the present invention provides an extensible and retractable belt assembly of the type described having improved accessory tools useful therewith in quickly and simply effecting the extension and retraction thereof.

Still another object of the present invention is the provision of an extensible and retractable belt conveyor assembly of the type described and a cooperating bridge conveyor assembly having a winch assembly mounted thereon for use in effecting the extension and retraction of the belt conveyor assembly.

Another object of the present invention is the provision of an extensible and retractable belt conveyor assembly of the type described which is simple but rugged in construction and provides, when assembled, the unusually great strength required in underground coal mining operation.

Still another object of the present invention is the provision of a belt conveyor assembly of the type described which is sturdy in construction, simple in operation and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIGURE 2 is a side elevational view of the discharge end of the conveyor assembly of the present invention;

FIGURE 3 is a top plan view of the structure shown in FIGURE 2;

FIGURE 4 is a side elevational view of the receiving end of the conveyor assembly of the present invention;

FIGURE 5 is a top plan view of the structure shown in FIGURE 4;

FIGURE 6 is a fragmentary transverse sectional view of the conveyor assembly, showing a roller stand unit;

FIGURE 7 is a perspective view of a roller stand unit illustrating one pair of adjacent side rail sections assembled to one side of the stand unit and a second pair of side rail sections in exploded relation with respect to the other side of the roller stand unit;

FIGURE 8 is a perspective view, with parts broken away, of a belt guide assembly or unit of the present invention;

FIGURE 9 is a persepctive view of an accessory tool useful in assembling and dis-assembling the side rail sections with the roller stand units;

FIGURES 10 and 11 are perspective views of accessory belt clamps useful in effecting the connection of the belt during its extension and retraction; and FIGURE 12 is a fragmentary top plan view of the discharge end of the bridge conveyor assembly showing a winch assembly thereon useful in effecting the connection of the belt of the floor conveyor assembly.

Figure 1:
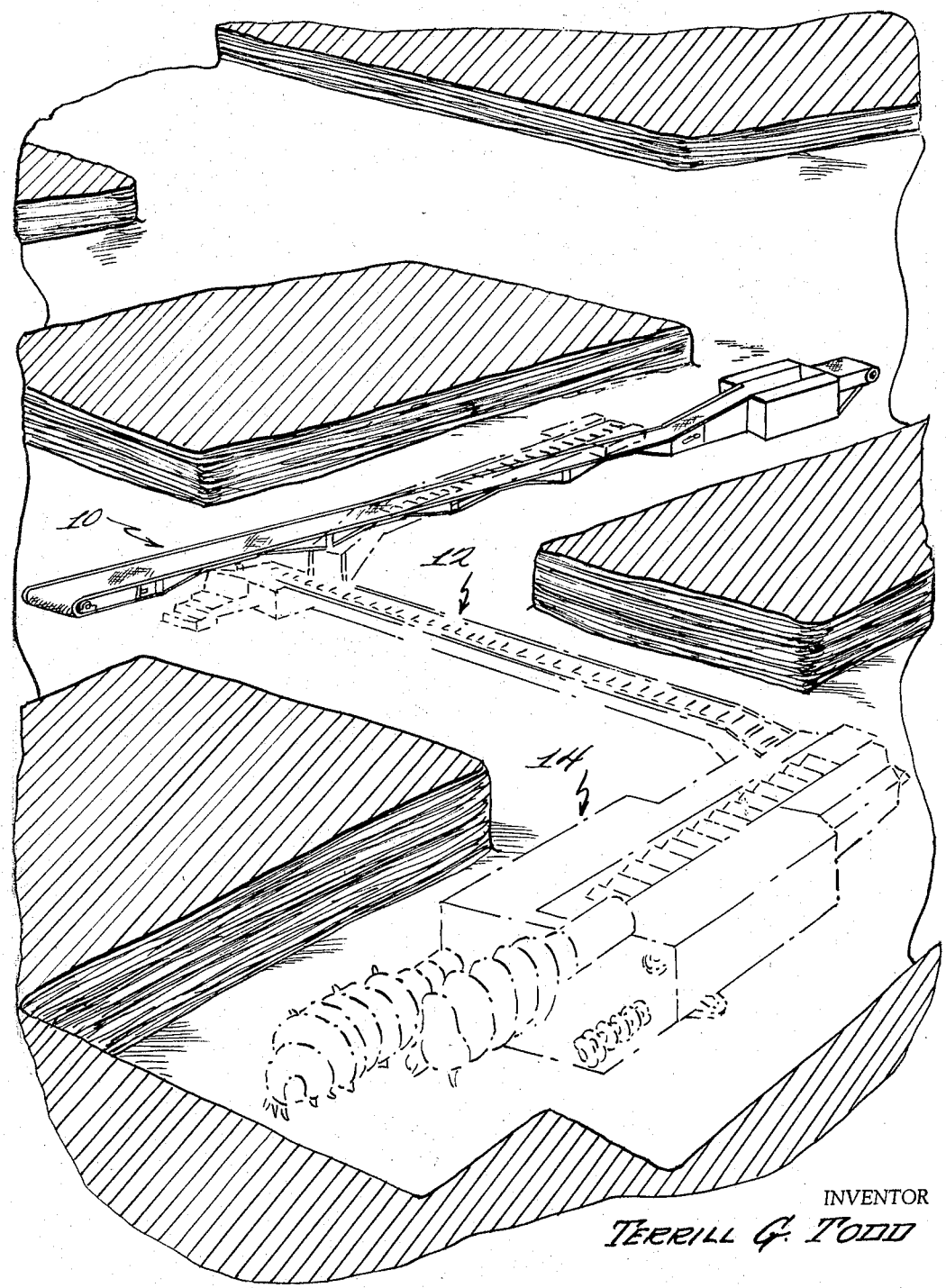
FIGURE 1 is a somewhat diagrammatic perspective view of a conveyor assembly embodying the principles of the present invention, showing the manner in which the assembly is used in conjunction with a continuous mining machine and universal bridge conveyor assembly operatively connected between the mining machine and the conveyor assembly of the present invention.

Referring now more particularly to the drawings, there is shown in FIGURE 1 a floor conveyor assembly, generally indicated at 10, embodying the principles of the present invention. The conveyor assembly 10 is shown in FIGURE 1 operatively connected with the discharge end of a bridge conveyor assembly, generally indicated at 12, the receiving end of which is operatively connected with a continuous mining machine, generally indicated at 14.

While the floor conveyor assembly 10 of the present invention is constructed so as to provide an operative cooperation with the bridge conveyor assembly 12, the assembly 10 has general utility as a floor conveyor in underground coal mining and is generally useful wherever it is desired to convey material to a fixed discharge position and at the same time allow for selective extension or contraction of the receiving end of the conveyor assembly.

The bridge conveyor assembly 12 which is shown to illustrate the preferred use of the present floor conveyor assembly 10 is constructed and operated as disclosed in my co-pending application Serial No. 159,636, filed December 15, 1961, abandoned in favor of continuation application Serial No. 486,368, filed September 10, 1965, the disclosure of which is hereby incorporated by reference into this application.

As stated in my co-pending application, the bridge conveyor assembly 12 may be utilized with any type of machine capable of working in the mining face but is particularly suited for use with a continuous mining machine, such as the machine 14 shown in the drawings. This machine constitutes the Wilcox Mark 20 Continuous Miner, manufactured by the Wilcox Manufacturing Company of Raleigh, West Virginia and is constructed in accordance with the principles set forth in Wilcox Patent 3,026,098. A brief disclosure of this machine and the manner in which it cooperates with the bridge conveyor 12 is also disclosed in my co-pending application.

Referring now more particularly to FIGURES 2 and 3, the discharge end of the floor conveyor assembly 10 of the present invention includes a horizontally extending bottom frame plate 16, the lower surface of which is adapted to rest on the mine floor. Fixedly secured to the bottom frame plate 16, as by welding or the like, and extending upwardly therefrom in a pair of side frame plates or members 18. Preferably, the side plates 18 include upper rearward portions 20 which extend rearwardly and above the rearward end of the bottom frame plate 16. Journalled between the side plates 18 at a position just forwardly of the rearwardly extending portions 20 is a main drive roller 22, suitably fixed to a shaft 24, which, in turn, is journalled in suitable bearings 26 fixed to the side plates 18. The drive roller 22 is rotated by any suitable means, such as an electric motor 28 or the like connected, through a conventional slip clutch assembly 29, to drive a conventional variable speed reduction unit 30. The output shaft of the speed reducer is drivingly connected with the drive roller shaft 24 by any suitable means, such as a dual chain and pulley assembly 32. The drive roller 22 is adapted to drive an endless flexible belt 34 of any conventional construction. In order to provide a maximum peripheral contact of the belt 34 with the drive roller 22 there is provided a pair of idler rollers 36 and 38 suitably journalled between the side plates 18 with their axes of rotation in horizontal alignment and spaced above the axis of the shaft 24 on opposite sides thereof.

Disposed adjacent the rearward extremity of the side plate portions 20 is a discharge roller 40 suitably journalled between the side plate portions 20 and, as shown, with its axis disposed in horizontal alignment with the axes of the idler rollers 36 and 38.

Fixedly connected with the forward vertical edges of the side plates 18 and extending forwardly therefrom is a pair of forward side frame plates or members 42, the forward extremities of which are rigidly interconnected by a skid-like member 44, the lower surface of which is adapted to engage the mine floor to provide support for the conveyor assembly. Each forward side plate 42 has an elongated slot 46 formed therein which extends slightly upwardly and rearwardly from the forward end portion thereof. Slidably mounted within the spaced slots 46, respectively, are two bearing assemblies 48 which are rigidly interconnected by a generally U-shaped cross frame member 50. Journalled within the bearing assemblies 48 is a take-up roller 52 which is capable of movement with the bearing assemblies 48 along the extent of the elongated slots 46.

Any suitable means may be provided for effecting the movement of the take-up roller along the slots 46 and, as shown, there is provided a conventional double acting piston and cylinder assembly or unit 54 having the piston rod thereof connected to the central portion of the frame member 50 and the cylinder and thereof connected to the central portion of a fixed cross frame member 56 rigidly connected between the forward portion of the side plates 18. It will be understood that a suitable hydraulic system for actuating the piston and cylinder assembly 54 is provided, such as a pump 58 driven by the speed reducer 30, a hydraulic tank or sump 60 and a control valve 62 connected in conventional fashion so that by actuating the valve in one direction the hydraulic piston and cylinder unitis operated to move the take-up roller forwardly and actuation of the valve in the opposite direction will operate the hydraulic piston and cylinder assembly to move the take-up roll in the opposite direction.

As can be seen from FIGURE 2, the belt 34 is trained respectively about the discharge roller 40, idler roller 38, drive roller 22, idler roller 36, take-up roller 52 and then about an idler roller 64 suitably journalled between the forward side plates 42 adjacent the lower rearward end portion thereof. The portion of the belt which is trained about the rollers, as indicated above, constitutes the discharge end of the lower flight of the belt 34. As best shown in FIGURE 4, the receiving end of the lower flight of the belt 34 is trained about a receiving roller 66 suitably journalled between the forward ends of a pair of side frame sections 68. The side frame sections preferably comprise a pair of parallel transversely spaced U-shaped tubular members, each disposed with its legs in horizontally extending relation one above the other and with its bight portion disposed forwardly. The forward extremity of the bight portions of both tubular members are rigidly interconnected, as by a cross frame member 70, and the rearward portion of the tubular members are provided with suitable vertical braces 72, to which are connected a pair of rearwardly converging wiper blades 74.

The lower flight of the belt 34 between the receiving roller 66 and idler roller 64 is supported by a plurality of lower flight roller assemblies 76, each of which forms a part of a roller stand unit, generally indicated at 78.

The upper flight of the belt which extends from the receiving roller 66 to the discharge roller 40 is supported in trough-like form by a plurality of trough roller assemblies 80, one of which is included as a part of each roller stand unit 78.

Referring now more particularly to FIGURE 6 each roller stand unit 78 comprises a pair of transversely spaced U-shaped side members or supports 82 which are rigidly interconnected by a pair of horizontally spaced and horizontally aligned tubular members 84. Mounted on the upper end of the inner leg of each U-shaped support is a horizontal bracket plate 86 having an elongated slot 88 formed therein. Each bracket plate 86 receives an apertured hanger plate 90 which is longitudinally adjustably secured to the bracket plate 86, as by a bolt assembly 92 or the like.

Each trough roller assembly 80 is connected between the pair of hanger plates 90 and includes a central roller assembly 94 and a pair of upwardly and outwardly inclined side roller assemblies 96. Each roller assembly includes a shaft section 98 having a bearing assembly 100 mounted at a position inwardly of each end thereof. The outer race of each bearing assembly has a retainer 102 connected therewith and a cylindrical roller member 104 is disposed in surrounding relation to the shaft section 98 in concentric relation therewith and has its ends fixed to the respective retainers. The inner end of the shaft of each inclined side roller assembly 96 is fixedly connected with the adjacent end of the shaft of the central roller assembly 94 by an annular hollow coupling 106 detachably fixedly secured to the respective shaft ends, as by pins 108. The outer end of each shaft section of the side roller assemblies 96 is fixed to the associated hanger plate 90 between a pair of spaced loop portions 110 formed on the inner extremity of each hanger. A pin 112 serves to effect securement of the adjacent shaft section end to the hanger by engagement within the loop portions 110 and a suitable aperture formed in the extremity of the adjacent shaft section end.

It will be understood that each of the lower flight roller assemblies 76 is preferably constructed the same as the roller assemblies 94 and 96 described above. Thus, each lower flight roller assembly 76 includes an elongated shaft 114, a pair of bearing assemblies 116, a pair of retainers 118 and a cylindrical roller member 120. The end of the shaft 114 associated with each roller stand unit is connected with a hanger 122, similar to the hanger 90, as by a pin 124. As before, each hanger 122 is longitudinally adjustably secured, as by a bolt assembly 126, to a slotted bracket plate 128 fixedly secured, as by welding or the like, to the lower portion of the inner leg of the associated U-shaped support 82 in longitudinally offset relation with respect to the bracket plate 86.

Referring now more particularly to FIGURE 7, the roller stand units 78 are fixedly retained in operative position by a plurality of side rail sections 130. Each side rail section includes an upper straight tubular rail member 132 and lower upwardly-bowed brace member 134. Preferably, the brace member is of tubular stock of a diameter less than the tubular stock of the upper rail member 132 and is rigidly connected with the associated upper rail member 132 by a plurality of gusset plates 136 welded or otherwise rigidly secured therebetween. A pair of connector plates 138 and 140 are rigidly secured as by welding or the like, between the ends of the rail member 132 and brace member 134 respectively. Each connector plate 138 is of a thickness equal to or slightly less than half the thickness of the space between the U-shaped supports 82 of the roller stand units. The connector plate 138 is disposed with its inner vertical surface in alignment with the axis of the tubular rail member 132 while the opposite connector plate 140 has its outer vertical surface in alignment with the axis of the tubular rail member 132. The connector plates 138 and 140 are provided with pin receiving apertures 142 and 144 respectively and corresponding pin receiving openings 146 are formed in each of the U-shaped support members 82.

As best shown in FIGURES 4 and 5, the side rail sections 130 are all of the same length except for the side rail sections indicated at 130' which are of a length approximately one-half the length of the remaining sections. The extent of the movement of the take-up roller 52 is equal to approximately one-half the length of the side rail sections 130.

It will be understood that the forward extremity of the forward side plates 42 are provided with registering openings to receive in registering side-by-side relation the openings 144 of a pair of side rail sections 130 and that the rearward end of the receiving end side frame sections 68 is provided with a pair of transversely spaced connector plates 140' having openings 144' therein corresponding to the connector plates 140 of the side rail sections. It can be seen that by connecting a desired number of side rail sections 130 between the receiving end section of the conveyor assembly and the discharge end section thereof with roller stand units 78 interconnecting the junctures of the adjacent side rail sections 130 that the conveyor assembly 10 of the present invention can be quickly and easily panned up to provide a floor conveyor capable of being extended or contracted to keep up with a machine working at the mine face.

It will be seen that the connection of each pair of aligned adjacent side rail sections with the associated roller stand unit is accomplished by inserting the associated connector plates 138 and 140 in side-by-side lapped relation within the space between the legs of the associated U-shaped support 82. A headed pin 148 having an apertured tapered portion 150 adjacent the free end thereof is readily driven into the aligned apertures 142, 144 and 148 so as to assemble the side rail sections 130 to the roller stand unit. In order to insure that the pin 148 is retained within the apertures, a toggle loop locking pin 152 of conventional construction is preferably inserted within the apertured end of the pin 148. Similar pins 148 and 152 are utilized to detachably fixedly secure the rearwardmost side rail sections to the forward side plates 42.

The utilization of a single fastening element to effect the rigid securement of three elements is an important feature of the present invention which simplifies the extension or retraction procedure and minimizes the time required to accomplish the same. When assembling additional side rail sections, the connecting pin 148 is easily installed by simply driving the same within the registering apertures. In the event that the apertures are not in exact registry the tapered end 150 of the pin will serve to cam the openings into aligned registry.

The pin connection also serves another important function in that it provides for a limited amount of vertical articulation throughout the longitudinal extent of the conveyor assembly, thus enabling it to conform to the uneven conditions that invariably are presented in the floor of an underground coal mine. It will be noted that the axes of the apertures 142 and 144 are disposed in a vertical plane which is spaced outwardly from the adjacent end surface of the associated rail member 132. For example, this stand-off may be of the order of 1/16 of an inch which permits a limited amount of articulation or relative pivotal movement of the interconnected side rail sections in an upward direction.

While a limited vertical articulation of the conveyor assembly is desirable it is likewise desirable that the conveyor assembly be horizontally fixed or rigid so as to insure proper alignment of the belt on the roller assemblies. This result is accomplished by providing for a snug fit of the connector plates between the leg portions of the U-shaped supports.

Referring now more particularly to FIGURE 8, there is shown therein a belt guide assembly, generally indicated at 154, a plurality of which are used with the conveyor assembly to maintain proper belt alignment, during operation. As shown, each belt guide assembly includes a generally U-shaped stand or frame 156 which is disposed in a generally horizontal plane. Extending upwardly and fixedly secured to the bight portion of the frame 156 is a pair of shafts 158. Each shaft has suitably journaled on the lower portion thereof, as by bearing assemblies 160, a lower relatively short guide roller 162 which is positioned vertically to engage the adjacent edge of the lower flight of the belt 34. Mounted on each shaft, as by bearing assemblies 164, is an upper relatively long belt roller 166 which is positioned vertically to engage the adjacent edge of the upper flight of the belt 34.

In actual operation, a belt guide assembly 154 is installed at every third, fourth or fifth roller stand assembly. Preferably, each belt guide assembly is installed during the assembly of the roller stand to which it is attached. To this end, the free ends of the legs of the frame 156 are positioned within the lower portion of the U-shaped supports 82 below the associated connector plates 138 and 140. In this way, each belt guide assembly is easily installed while at the same time being positively secured and accurately located with respect to the belt 34.

Referring now more particularly to FIGURE 9, there is shown therein a hand tool 168 which is adapted to be used to facilitate the assembly of the supports 82 with the connector plates 138 and 140 and particularly the engagement of the toggle loop locking pins 152 within the connecting pins 148. As shown, the tool 168 includes an elongated hand 170 having a generally L-shaped member 172 fixed to the lower end portion thereof. As shown, the securement of the member 172 to the hand 170 is by means of a shaft 174 fixed to the handle, by any suitable means, such as a pin or the like, and likewise fixedly mounted, as by a pin or the like, to an apertured boss portion 176 formed on the free end of one of the legs of the member 172. The opposite leg of the L-shaped member 172 extends outwardly beyond the end of the handle and is provided with an inner abutment surface 178 which is adapted to engage beneath the head of the bolt 148. At the extremity of the handle 170 adjacent the shaft 174, a headed stub shaft 180 is fixedly secured, by any suitable means, such as a pin or the like, and a cam roller 182 is journaled on the stub shaft so that its peripheral surface extends outwardly of the end of the handle for the purpose of engaging the outer leg of the U-shaped support 82 at a position below the pin 148.

It can be seen that the tool 168 provides the operator with a convenient mechanism for applying leverage to the U-shaped supports 82 to draw the legs thereof together so that the plates 138 and 140 will be snugly embraced therebetween. This is accomplished simply by engaging the abutment 178 beneath the head of the bolt 148 and then moving the cam roller 182 downwardly into engagement with the outer leg of the stem 82 below the end 150 of the pin 148. By moving downwardly on the outer end of the handle 170 the leverage mentioned above which insures a snug engagement is easily achieved. It will be noted that the aperture in the end 150 of the pin is positioned so that insertion of the toggle loop locking pin 152 within the opening will maintain the U-shaped support 82 in snug engagement on opposite sides of the lapped connector plates. Thus, in actual operation the connector pin 152 is simply inserted while the operator is applying a downward pressure on the outer end of the handle, which insures that the opening which received the pin 152 is properly positioned with respect to the outer surface of the support 82.

It will also be understood that whenever additional side rail sections 130 and roller stand units 78 are either added to or taken away from the conveyor assembly, an appropriate section of the belt 34 must likewise be added or taken away. To this end, the belt 34 is provided with conventional hinge connectors 184. Prior to the disconnection of the hinge connection 184 for the purpose of assembling or disassembling sections of the conveyor, take-up roller 52 is moved, by the piston and cylinder assembly 54 in a direction toward the discharge end of the conveyor assembly to relieve the tension in the belt and permit disassembly of the hinge connection 184.

In this regard, it will be understood that the assembly or disassembly of the conveyor is always accomplished at the receiving end which is remote from the discharge end where the takeup roller 52 is mounted. As a matter of convenience, an alternate electric control for the operation of the takeup roller 52 of a conventional nature (not shown) is preferably provided which can be extended to the receiving end of the conveyor assembly.

Moreover, when the present conveyor assembly has been built up to a considerable length it becomes a somewhat difficult job to manually bring together the final hinge connections 184 for the purpose of completing the assembly of the entire belt. To aid in this operation, there is provided a pair of belt clamp assemblies 186 and 188, as shown in FIGURES 10 and 11. Each of the belt clamp assemblies comprises a pair of rigid elongated bars 190 having a strip of belting or other suitable belt engaging material 192 fixed to one surface thereof. Any suitable means is provided for quickly securing the bars on opposite sides of the belt with the strips 192 in engagement with the opposite surfaces of the belt. As shown, such means comprises a pair of bolts 194. One bolt extends through suitable apertures formed adjacent one end of cooperating bars while the other bolt extends through an aperture in one of the bars and is adapted to engage within a notch 196 formed in the end of the other bar. Final securement of the clamp assembly is accomplished by tightening nuts 198 provided with rigid handles 200 extending radially therefrom.

The clamp assembly 188 includes a rigid hook portion 202 fixed to the central portion of one of the bars 190 for the purpose of engaging a tubular member 84 of a roller stand assembly. The clamp assembly 186 has one end of a chain 204 fixedly secured to the central portion of one of the bars thereof, the opposite end of the pin having a hook 206 connected therewith.

Referring now more particularly to FIGURE 12, it will be noted that the discharge end of the bridge conveyor assembly 12 is provided with a winch assembly 208, of generally conventional construction, around which a cable 210 is wound. The free end of the cable extends outwardly from the winch assembly 208 between a pair of guide rollers 212 and the outer extremity is provided with an eye connector 214 of a size to receive the hook 206. The winch assembly includes a control lever 216 which, because the discharge end of the bridge conveyor assembly is always disposed in the proximity of the receiving end of the floor conveyor it is conveniently accessible to the operators who are effecting the assembly or disassembly of the floor conveyor.

It will be understood that by securing the clamp assembly 188 to the lower flight of the belt 34 and engaging the hook portion 202 to a tubular member 84 of an assembled roller stand and securing the clamp assembly 186 adjacent the free end of the upper flight of the belt to be connected, the winch assembly 208 can be actuated, as by control lever 216, to apply a desired tension to almost the entire portion of the belt prior to effecting an actual connection. With the belt maintained in tension by the winch assembly, as indicated above, the actual securement of the hinge connection 184 is greatly facilitated.

Referring now more particularly to FIGURE 4, it will be understood, that in accordance with the teaching of my aforesaid co-pending application, Serial No. 159,636, the discharge end section of the bridge conveyor assembly 12 is supported on the rail members 132 for longitudinal movement therealong, for limited tilting movement and for horizontal swinging movement. As shown, the discharge end of the bridge conveyor assembly includes a frame, generally indicated at 218, having a ring 220 swivelly mounted thereon at a position to receive the coal passing from the discharge end of the conveyor. The swivel ring includes a pair of diametrically opposed depending plates which are pivoted as at 222 to a wheeled frame 224. The wheeled frame includes four flanged wheels 226 which rollingly contact the side rail members 132.

It can thus be seen that there has been provided a conveyor assembly which secures the horsepower saving of a belt type conveyor and which, at the same time, is quickly and easily extended or retracted. The construction is exceedingly rugged and, at the same time, is arranged to be handled in separate units and sections, each of which has a minimum weight capable of being easily moved by one operator. For example, a rail section 130 will weigh as little as 36 pounds and a roller stand unit will weigh as little as 28 pounds.

The construction also permits a minimum height which is of considerable importance in low vein underground coal mines. When assembled, the overall height of the conveyor assembly, disregarding the discharge end section thereof (height approximately 2 feet), is as low as 9 inches. This height is sufficiently low to easily permit the discharge end of a bridge conveyor to be disposed thereabove as shown in FIGURES 1 and 4. Moreover, the side rail sections provide a substantially continuous pair of parallel rails upon which rollers supporting the discharge end of the bridge conveyor assembly may be engaged to permit longitudinal movement of the discharge end of the bridge conveyor assembly along the conveyor assembly of the present invention in the manner disclosed in my co-pending application. In a typical operation, connection or disconnection of approximately 37½ feet of newly assembled or disassembled conveyor length can be accomplished in approximately 15 minutes by three men.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A belt conveyor assembly suitable for use as an underground coal mining floor conveyor in conjunction with face machinery and a bridge conveyor operatively connected between the face machinery and the floor conveyor comprising a discharge end section having a drive roller and a movable take up roller, a receiving end section including a receiving end roller, an endless belt assembly trained about said rollers so as to provide an upper coal carrying flight and a lower return flight, a plurality of separate longitudinally spaced transversely extending roller stand units disposed between said end sections, each of said roller stand units including an upper trough shaped roller assembly for supporting the upper coal carrying flight of said belt assembly in trough like configuration and a lower return flight roller assembly for supporting the lower return flight of said belt assembly, a plurality of separate elongated rigid side rail sections extending between the ends of each pair of adjacent roller stand units, and means for detachably connecting each end of each roller stand unit to the adjacent ends of the associated side rail sections in fixed horizontal relation and in limited vertical articulated relation, said side rail sections when connected with said roller stand units providing a pair of parallel substantially continuous upwardly facing rail surfaces for rollingly supporting the discharge end of a bridge conveyor assembly or the like.

2. A belt conveyor assembly suitable for use as an underground coal mining floor conveyor in conjunction with face machinery and a bridge conveyor operatively connected between the face machinery and the floor conveyor comprising a discharge end section having a drive roller and a movable take up roller, a receiving end section including a receiving end roller, an endless belt assembly trained about said rollers so as to provide an upper coal carrying flight and a lower return flight, a plurality of separate longitudinally spaced transversely extending roller stand units disposed between said end sections, each of said roller stand units including an upper trough shaped roller assembly for supporting the upper coal carrying flight of said belt assembly in trough like configuration and a lower return flight roller assembly for supporting the lower return flight of said belt assembly, and a pair of apertured U-shaped support members rigidly interconnected in transversely spaced relation between which said upper and lower roller assemblies are connected, a plurality of separate elongated rigid side rail sections extending between the ends of each pair of adjacent roller stand units, each of said side rail sections including an upper horizontally extending rail member and a vertically disposed apertured connector plate fixed in depending and longitudinally outwardly extending relation at each end of said rail member, the connector plates of each rail section being disposed generally in abutment with and on opposite sides of a vertical plane passing through the associated rail member so that the connector plate adjacent one end of one rail section can be disposed in side-by-side lapped relation with the connector plate adjacent the opposite end of another rail section with the rail member thereof in longitudinal alignment, the space between the legs of each U-shaped support member being of a size to snugly receive a pair of connector plates in side-by-side lapped relation therein with the apertures of said support member and said pair of connector plates in general registry to receive a securing element therethrough and a securing element for detachably connecting each end of each roller stand unit to the adjacent ends of the associated side rail sections in fixed horizontal relation and in limited vertical articulated relation, said side rail sections when connected with said roller stand units providing a pair of parallel, substantially continuous upwardly facing rail surfaces for rollingly supporting the discharge end of a bridge conveyor assembly or the like.

3. A belt conveyor assembly as defined in claim 2 wherein said connecting means comprises a headed pin engageable within each set of registering apertures, each pin including a tapered outer end portion having an aperture extending therethrough and a toggle loop pin engageable within each pin aperture.

4. A belt conveyor assembly as defined in claim 2 including a plurality of belt guide assemblies, each of said belt guide assemblies comprising a generally U-shaped frame having a pair of parallel leg portions and a central bight portion interconnecting said leg portions, the leg portions of each of said belt guide assemblies being mountable within a pair of support members of a roller stand unit below the associated lapped connector plates, the bight portion of each belt guide assembly having spaced pairs of guide rollers mounted thereon in positions to engage the opposite edge portions of the upper and lower flight of said belt assembly when the associated leg portions are mounted within a pair of support members.

5. A belt conveyor assembly as defined in claim 1 wherein said discharge end section comprises a horizontally disposed floor engaging frame plate having a pair of side plate means fixedly secured thereto and extending upwardly therefrom, said pair of side plate means having a pair of aligned elongated inclined slots extending upwardly and rearwardly therein, bearing assembly means slidably mounted within said elongated slots rotatably receiving said take-up roller, and means for effecting movement of said bearing assembly means along said slots to thereby move said take-up roller into different positions of adjustment.

6. A belt conveyor assembly as defined in claim 5 wherein said moving means comprises a double acting hydraulic pistson and cylinder unit.

7. A belt conveyor assembly as defined in claim 5 wherein said discharge end section further includes a pair of idler rollers disposed adjacent to and on opposite sides of drive roller and a discharge end roller disposed in horizontal alignment with said idler rollers in spaced relation above the lower surface of the conveyor assembly so as to permit the discharge end of the conveyor assembly to be disposed over and to discharge onto an entry conveyor extending transversely with respect thereto.

8. In a belt conveyor assembly of the type described the combination comprising a roller stand unit including a pair of apertured U-shaped support members rigidly interconnected in transversely spaced relation, an upper trough like roller assembly connected between the upper portions of said support members, and a lower roller assembly connected between the lower portions of said support members, and a plurality of rigid side rail sections of substantially identical contruction, each of said side rail sections including an upper horizontally extending rail member and a vertically disposed apertured connector plate fixed in depending and longitudinally outwardly extending relation at each end of said rail member, the connector plates of each rail section being disposed generally in abutment with and on opposite sides of a vertical plane passing through the associated rail member so that the connector plate adjacent one end of one rail section can be disposed in side-by-side lapped relation with the connector plate adjacent the opposite end of another rail section with the rail members thereof in longitudinal alignment, the space between the legs of each U-shaped support member being of a size to snugly receive a pair of connector plates in side-by-side lapped relation therein with the apertures of said support member and said pair of connector plates in general registry, to receive a securing element therethrough.

9. The combination as defined in claim 8 including a headed pin engageable within each set of registering apertures, each pin including a tapered outer end portion having an aperture extending therethrough and a toggle loop pin engageable with each pin aperture.

10. In a belt conveyor assembly of the type described, a roller stand unit comprising a pair of parallel U-shaped support members, each of said members including a pair of vertically extending inner and outer leg portions interconnected at their lower ends in transversely spaced relation by a floor engaging bight portion, the upper ends of said leg portions being disposed in transversely spaced relation, rigid means extending transversely between the inner leg portions of said support members fixedly securing the same in spaced relation, a trough like roller assembly connected between the upper portions of the inner leg portions of said support members and a lower roller assembly connected between the lower portions of the inner leg portions of said support members, the leg portions of both support members having transversely aligned securing element receiving apertures formed therein.

11. In a belt conveyor assembly of the type described, a side rail section comprising an elongated rail member providing an upwardly facing continuous roller engaging surface, a vertically disposed connector plate fixedly mounted in depending and longitudinally outwardly extending relation adjacent each end of said rail member, said connector plates being disposed generally in abutment with and on opposite sides of a vertical plane passing through said rail member in the direction of extent of said roller engaging surface, each of said connector plates having a securing element receiving aperture formed therein.

12. The structure as defined in claim 11 wherein the axis of each aperture is disposed in a vertical plane spaced slightly outwardly from the adjacent end of said rail member.

13. In combination a belt conveyor assembly arranged to be supported on an underground coal mining floor, said belt conveyor assembly comprising a discharge end section having a drive roller and a movable take-up roller, a receiving end section including a receiving end roller, frame means extending between said end sections providing a plurality of longitudinally spaced upper trough-shaped roller assemblies and a plurality of longitudinally spaced lower roller assemblies, endless belt means trained about said rollers so as to provide an upper coal carrying flight supported in trough-like configuration by said upper roller assemblies and a lower return flight supported by said lower roller assemblies, said frame means including a plurality of sections attachable and detachable to vary the effective length of said belt conveyor assembly, said endless belt means including a plurality of sections attachable and detachable in end-to-end relation to accommodate the variation in the effective length of said belt conveyor assembly, said frame means providing a pair of parallel substantially continuous upwardly facing rail surfaces, a bridge conveyor having a receiving end adapted to receive coal from a machine working at the mine face and a discharge end section, the discharge end section of said bridge conveyor having means engaging said upwardly facing rail surfaces for rollingly supporting the discharge end section of said bridge conveyor for both longitudinal and horizontal swinging movement with respect to said belt conveyor so that coal carried by said bridge conveyor will be discharged from the discharge end section thereof onto the upper flight of said floor conveyor assembly in any position of movement of said bridge conveyor with respect to said floor conveyor assembly, a winch assembly carried by the discharge end section of said bridge conveyor, and means cooperable with said winch assembly and said belt sections for applying tension to said endless belt means throughout a major portion of the extent thereof and relieving the tension on the remaining portion thereof so as to facilitate the attachment and detachment of the adjacent ends of a pair of belt sections disposed in the portion of the endless belt means in which the tension is relieved.

14. The combination as defined in claim 13 wherein said last-mentioned means comprises a first clamp assembly engageable with a first portion of said endless belt means and with said frame means for preventing movement of said first portion of said belt means with respect to said frame means in one direction and a second clamp assembly engageable with a second portion of said endless belt means remote from said first portion in said one direction and with said winch assembly for moving said second portion of said belt means in a direction corresponding to said one direction of movement and therefore tension said belt means extending between said clamp assemblies.

15. An accessory tool for use in assembling and disassembling a belt conveyor assembly of the type comprising a roller stand unit including a pair of apertured U-shaped support members rigidly interconnected in transversely spaced relation, an upper trough-like roller assembly connected between the upper portions of said support members, and a lower roller assembly connected between the lower portions of said support members, and a plurality of rigid side rail sections of substantially identical construction, each of said side rail sections including an upper horizontally extending rail member and a vertically disposed apertured connector plate fixed in depending and longitudinally outwardly extending relation at each end of said rail member, the connector plates of each rail section being disposed generally in abutment with and on opposite sides of a vertical plane passing through the associated rail member so that the connector plate adjacent one end of one rail section can be disposed in side-by-side lapped relation with the connector plate adjacent the opposite end of another rail section with the rail members thereof in longitudinal alignment, the space between the legs of each U-shaped support member being of a size to snugly receive a pair of connector plates in side-by-side lapped relation therein with the apertures of said support member and said pair of connector plates in general registry, a headed pin engageable within each set of registering apertures, each pin including a tapered outer end portion having an aperture extending therethrough and a toggle loop pin engageable with each pin aperture, said accessory tool comprising means defining a first abutment surface for engaging beneath the head of a headed pin engaged within a set of registering apertures, a second abutment surface for engaging the associated U-shaped support member at the side thereof adjacent the tapered outer end portion of the headed pin engaged in said registering apertures, and means connecting said first and second abutment surfaces in fixed spaced relation, said means including an elongated handle movable in one direction with the abutment surfaces in engagement as aforesaid so as to bring the legs of the U-shaped support member into snug engagement with the associated pair of connector plates in side-by-side lapped relation therebetween and effect registry of the aperture in the outer end portion of said headed pin with the adjacent outer surface of the associated U-shaped support member so as to permit a toggle loop pin to be engaged therein to retain the U-shaped support member in snugly engaging relation with respect to the pair of connector plates.

16 An accessory tool as defined in claim 15 wherein said second abutment surface comprises a periphery surface of a rotatable roller.

References Cited by the Examiner
UNITED STATES PATENTS

| | | | |
|---|---|---|---|
| 1,932,897 | 10/1933 | Jaggard | 198—7 |
| 2,128,309 | 8/1938 | Madeira | 198—192 |
| 2,168,622 | 8/1939 | Levin | 198—192 |
| 2,179,189 | 11/1939 | Kendall | 198—192 |
| 2,205,013 | 6/1940 | Joy | 198—139 |
| 2,452,980 | 11/1948 | Beltz | 198—208 |

FOREIGN PATENTS

| | | |
|---|---|---|
| 788,374 | 1/1958 | Great Britain. |
| 945,337 | 12/1963 | Great Britain. |

References Cited by the Applicant
UNITED STATES PATENTS

| | | |
|---|---|---|
| 2,437,499 | 3/1948 | Benjamin. |
| 2,554,037 | 5/1951 | Lee. |
| 2,808,145 | 10/1957 | Bergmann et al. |
| 2,842,257 | 7/1958 | Craggs et al. |
| 2,925,901 | 2/1960 | Hallman. |
| 3,039,596 | 6/1962 | Poundstone. |

EVON C. BLUNK, *Primary Examiner.*

RICHARD E. AEGERTER, *Examiner.*